United States Patent
Hsu

(10) Patent No.: US 8,879,850 B2
(45) Date of Patent: Nov. 4, 2014

(54) IMAGE STABILIZATION METHOD AND IMAGE STABILIZATION DEVICE

(75) Inventor: Yu-Feng Hsu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 418 days.

(21) Appl. No.: 13/327,717

(22) Filed: Dec. 15, 2011

(65) Prior Publication Data

US 2013/0121597 A1    May 16, 2013

(30) Foreign Application Priority Data

Nov. 11, 2011    (TW) .............................. 100141253 A

(51) Int. Cl.
| | | |
|---|---|---|
| *G06K 9/46* | (2006.01) | |
| *H04N 5/21* | (2006.01) | |
| *G06T 7/20* | (2006.01) | |
| *H04N 21/414* | (2011.01) | |

(52) U.S. Cl.
CPC ..... *G06T 7/2033* (2013.01); *G06T 2207/30241* (2013.01); *H04N 21/41422* (2013.01); *G06T 2207/20201* (2013.01); *H04N 5/21* (2013.01); *G06T 2207/30244* (2013.01)
USPC ....................................................... 382/201

(58) Field of Classification Search
USPC ............... 382/103, 190, 201, 276; 348/208.4, 348/208.13–208.14
See application file for complete search history.

(56) References Cited

U.S. PATENT DOCUMENTS

| | | |
|---|---|---|
| 5,096,802 A | 3/1992 | Hu |
| 5,608,404 A | 3/1997 | Burns et al. |
| 5,734,948 A | 3/1998 | Nagayama et al. |
| 5,736,305 A | 4/1998 | Nomura |
| 6,574,447 B2 | 6/2003 | Matsuo et al. |
| 6,933,968 B2 | 8/2005 | Yamazaki |
| 7,212,231 B2 | 5/2007 | Ohta |

(Continued)

FOREIGN PATENT DOCUMENTS

| | | |
|---|---|---|
| CN | 1809125 | 7/2006 |
| CN | 101126639 | 2/2008 |

(Continued)

OTHER PUBLICATIONS

Lee et al., "Video Stabilization using Robust Feature Trajectories", IEEE 12th International Conference on Computer Vision, Sep. 29-Oct. 2, 2009, pp. 1-8.

(Continued)

*Primary Examiner* — Ishrat I Sherali
(74) *Attorney, Agent, or Firm* — Jianq Chyun IP Office

(57) ABSTRACT

An image stabilization method and an image stabilization device are provided. In the method, each of images to be processed is detected by a feature point detection method to detect a plurality of feature points. The relationship of the same feature points in adjacent images to be processed is analyzed. According to the relationship of the feature points, a homography transform matrix of adjacent images to be processed is calculated. Based on the known feature points and the homography transform matrix, a stabilization matrix and a plurality of adjustment matrices corresponding to each image to be processed are calculated. Compensation is performed on each image to be processed by the adjustment matrices, so as to produce a plurality of corrected images. A first image of adjacent corrected images multiplied by the same stabilization matrix is transformed to a second image of the adjacent corrected images.

14 Claims, 4 Drawing Sheets

(56) References Cited

U.S. PATENT DOCUMENTS

| | | | |
|---|---|---|---|
| 7,430,000 B2 | 9/2008 | Yamazaki | |
| 7,440,008 B2 | 10/2008 | Lai et al. | |
| 7,453,493 B2 | 11/2008 | Pilu | |
| 7,760,448 B2 | 7/2010 | Nagata et al. | |
| 7,999,856 B2 | 8/2011 | Ming | |
| 8,289,402 B2* | 10/2012 | Saito | 348/208.4 |
| 8,396,286 B1* | 3/2013 | Aradhye et al. | 382/159 |
| 8,446,468 B1* | 5/2013 | Medioni et al. | 348/144 |
| 8,531,535 B2* | 9/2013 | Kwatra et al. | 348/208.14 |
| 8,611,602 B2* | 12/2013 | Jin et al. | 382/103 |
| 8,675,918 B2* | 3/2014 | Jin et al. | 382/103 |
| 2002/0047906 A1 | 4/2002 | Ohta | |
| 2002/0101495 A1 | 8/2002 | Matsuo et al. | |
| 2002/0130953 A1 | 9/2002 | Riconda et al. | |
| 2003/0142218 A1 | 7/2003 | Yamazaki | |
| 2005/0185058 A1 | 8/2005 | Sablak | |
| 2005/0248662 A1 | 11/2005 | Yamazaki | |
| 2006/0201047 A1 | 9/2006 | Lowrey, III | |
| 2006/0210007 A1 | 9/2006 | Koskelo et al. | |
| 2008/0024594 A1 | 1/2008 | Ritchey | |
| 2008/0225127 A1 | 9/2008 | Ming | |
| 2009/0160953 A1 | 6/2009 | Nagata et al. | |
| 2009/0161237 A1 | 6/2009 | Nagata et al. | |
| 2009/0213234 A1 | 8/2009 | Chen et al. | |
| 2010/0080415 A1 | 4/2010 | Qureshi et al. | |
| 2010/0080417 A1 | 4/2010 | Qureshi et al. | |
| 2010/0118156 A1 | 5/2010 | Saito | |
| 2010/0322476 A1 | 12/2010 | Kanhere et al. | |
| 2011/0115926 A1 | 5/2011 | McLeod et al. | |
| 2011/0134329 A1 | 6/2011 | Chen et al. | |
| 2013/0128062 A1* | 5/2013 | Jin et al. | 348/208.4 |

FOREIGN PATENT DOCUMENTS

| | | |
|---|---|---|
| CN | 101668114 | 3/2010 |
| TW | 200625203 | 7/2006 |
| TW | 200631411 | 9/2006 |
| TW | 200723894 | 6/2007 |
| TW | 200931343 | 7/2009 |
| TW | 201025193 | 7/2010 |
| TW | 201120807 | 6/2011 |

OTHER PUBLICATIONS

Shen et al., "Fast Video Stabilization Algorithm for UAV", IEEE International Conference on Intelligent Computing and Intelligent Systems, Nov. 20-22, 2009, pp. 542-546.

Eddy Vermeulen, "Real-time Video Stabilization for Moving Platforms", 21st Bristol Unmanned Aerial Vehicle (UAV) Systems Conference, Apr. 2007, pp. 1-14.

Wang et al., "Robust Digital Image Stabilization Using the Kalman Filter", IEEE Transactions on Consumer Electronics, Feb. 2009, pp. 6-14.

Lee et al., "Video stabilization for a camcorder mounted on a moving vehicle", IEEE Transactions on Vehicular Technology, Nov. 2004, pp. 1-8.

Matsushita et al., "Full-frame video stabilization", IEEE Computer Society Conference on Computer Vision and Pattern Recognition, Jun. 20-25, 2005, pp. 1-8.

Liu et al., "Content-Preserving Warps for 3D Video Stabilization", ACM SIGGRAPH, Aug. 2009, pp. 1-9.

Harris et al., "A Combined Corner and Edge Detector", In Proceedings of The Fourth Alvey Vision Conference, 1988, pp. 147-152.

"Office Action of Taiwan Counterpart Application", issued on Jul. 31, 2014, p. 1-p. 5.

\* cited by examiner

IMAGE STABILIZATION METHOD AND IMAGE STABILIZATION DEVICE

CROSS-REFERENCE TO RELATED APPLICATION

This application claims the priority benefit of Taiwan application serial no. 100141253, filed on Nov. 11, 2011. The entirety of the above-mentioned patent application is hereby incorporated by reference herein and made a part of this specification.

BACKGROUND OF THE DISCLOSURE

1. Field of the Disclosure

The disclosure relates to an image processing method and an image processing device. Particularly, the disclosure relates to an image stabilization method and an image stabilization device.

2. Description of Related Art

As video cameras are extensively set up in recent years, in addition to the use of monitoring systems, the video cameras are widely used in mobile carriers such as vehicles or airplanes, etc. Whatever the application domain is, the video camera is exposed in an environment that is liable to be influenced by external factors, for example, shaking of occasional wind or shaking of the mobile carrier itself may all influence images captured by the video camera, and further influence a subsequent image analysis performance, so that image stabilization gradually becomes an important issue in the image processing technique.

Based on different set up environments, the video cameras generally include fixed video cameras and mobile video cameras. Image stabilization of the fixed video camera is generally implemented by simply comparing a foreground with a background to remove a motion appeared in the foreground, i.e. to achieve a full stop effect. However, the mobile video camera generally moves along a smooth trajectory, and the smooth trajectory is a moving trajectory to be maintained, which cannot be removed. Therefore, regarding image stabilization of the mobile video camera, it is a key issue to separate a motion of the unknown smooth trajectory and a motion of a shaking component in the image.

According to different motion models (for example, a difference between a vehicle and an airplane), a most suitable model is selected in advance. And a smooth degree and an approximation degree have to be considered in selection of the motion model and parameters. Therefore, how to select a suitable model and adjust parameters of the smooth trajectory degree and the approximation degree are required to be resolved.

The second method for estimating the smooth trajectory is to use a Kalman filter to approximate the observed un-smooth trajectory, and use the characteristics of past data points to estimate the characteristics of future data points. In other words, a trajectory of the past data points is used to estimate a future possible smooth trajectory, and remove the shaking component other than the smooth trajectory.

The third method for estimating the smooth trajectory is a foreground removal method, by which image content is analyzed to separate a foreground motion and a background motion. Such method requires further computation on the image content. Moreover applicability of the method is required to deal that the foreground motion and the background motion be clearly separated in case the background is shaken violently.

Therefore, it is desirable required to develop an image stabilization method and an image stabilization device capable of finding a suitable smooth trajectory of the video camera and removing shaking components caused by external factors such as wind blowing and handshaking, etc.

SUMMARY OF THE DISCLOSURE

The disclosure is directed to an image stabilization method and an image stabilization device, by which a feature point detection method is used to calculate a homography transform matrix to describe a transform relationship between one image and a next image, so that the transform relationship of two adjacent corrected images is consistent, so as to achieve an image stabilization effect.

The disclosure provides an image stabilization method, which is adapted to process a plurality of images to be processed, and the image stabilization method includes following steps. A feature point detection method is used to detect each of the images to be processed, so as to detect a plurality of feature points in each of the images to be processed. A relationship of same feature points in adjacent images to be processed is analyzed. According to the relationship of the feature points, a homography transform matrix of the adjacent images to be processed is calculated. Based on the known feature points in each of the images to be processed and the homography transform matrices, a stabilization matrix and an adjustment matrix corresponding to each of the images to be processed are calculated. Each of the images to be processed is compensated by the adjustment matrix, so as to produce a plurality of corrected images. A first image of adjacent corrected images multiplied by the same stabilization matrix is transformed to a second image of the adjacent corrected images.

The disclosure provides an image stabilization device, which is adapted to process a plurality of images to be processed. The image stabilization device includes a feature point detection and analysis module, a homography matrix calculation module, a trajectory smoothing module and an image correction module. The feature point detection and analysis module detects each of the images to be processed for detecting a plurality of feature points in each of the images to be processed, and analyzes a relationship of same feature points in adjacent images to be processed. The homography matrix calculation module is coupled to the feature point detection and analysis module, and calculates a homography transform matrix of the adjacent images to be processed according to the relationship of the feature points. The trajectory smoothing module is coupled to the homography matrix calculation module, and calculates a stabilization matrix and an adjustment matrix corresponding to each of the images to be processed according to the known feature points in each of the images to be processed and the homography transform matrices. The image correction module is coupled to the trajectory smoothing module, and compensates each of the images to be processed by the adjustment matrix, so as to produce a plurality of corrected images. A first image of adjacent corrected images multiplied by the same stabilization matrix is transformed to a second image of the adjacent corrected images.

According to the above descriptions, in the image stabilization method and the image stabilization device of the disclosure, it is unnecessary to find a motion model corresponding to a moment when the image to be processed is shot or set parameters that influence the smooth degree, so as to avoid poor stabilization effect caused by improper parameter setting. Therefore, the image stabilization method and the image stabilization device of the disclosure are adapted to correct images to be processed that are captured in different shooting environments.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

The disclosure provides an image stabilization technique with high commonality, by which a transform relationship between corrected images is consistent, and a type of the transform consistency is not limited, so that it is adapted to various shooting environments, and when the environment is changed, it is unnecessary to re-find and set parameters as that does of the conventional technique. To fully convey the spirit of the disclosure, embodiments are provided below for detail descriptions, though the provided embodiments are only examples, which are not used to limit the disclosure.

Figure 1:
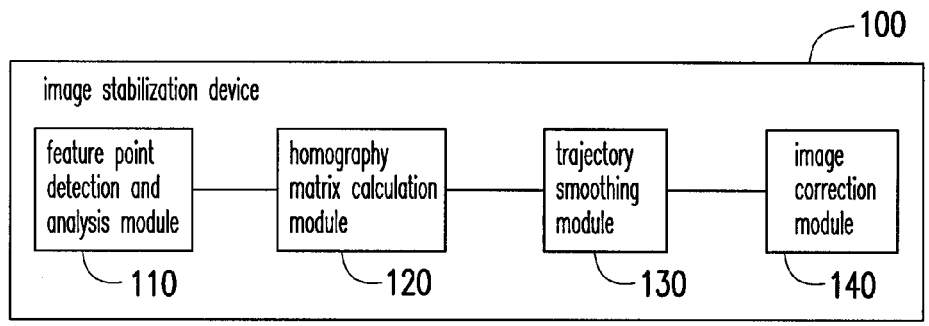
FIG. 1 is a block diagram of an image stabilization device according to an exemplary embodiment of the disclosure.

FIG. 1 is a block diagram of an image stabilization device according to an exemplary embodiment of the disclosure. Referring to FIG. 1, in the present exemplary embodiment, the image stabilization device is, for example, an electronic device having an image capturing function such as a video camera, a single lens reflex (SLR) camera or a digital camera, etc., i.e. an image stabilization processing of the disclosure can be directly performed on images captured by the image stabilization device itself. In another exemplary embodiment, the image stabilization device does not have the image capturing function, and the image stabilization device can receive a plurality of images to be processed through various wired or wireless data transmission modules. The image stabilization device of the disclosure is described in detail below.

As shown in FIG. 1, the image stabilization device 100 includes a feature point detection and analysis module 110, a homography matrix calculation module 120, a trajectory smoothing module 130 and an image correction module 140. The homography matrix calculation module 120 is coupled to the feature point detection and analysis module 110, and the trajectory smoothing module 130 is connected in series between the homography matrix calculation module 120 and the image correction module 140.

The aforementioned modules can be implemented by software, hardware or a combination thereof, which is not limited by the disclosure. The software is, for example, an application program or a driving program, etc., and the hardware is, for example, a central processing unit (CPU), a programmable general purpose or special purpose microprocessor, a digital signal processor (DSP), or an application specific integrated circuit (ASIC), etc.

Figure 2:
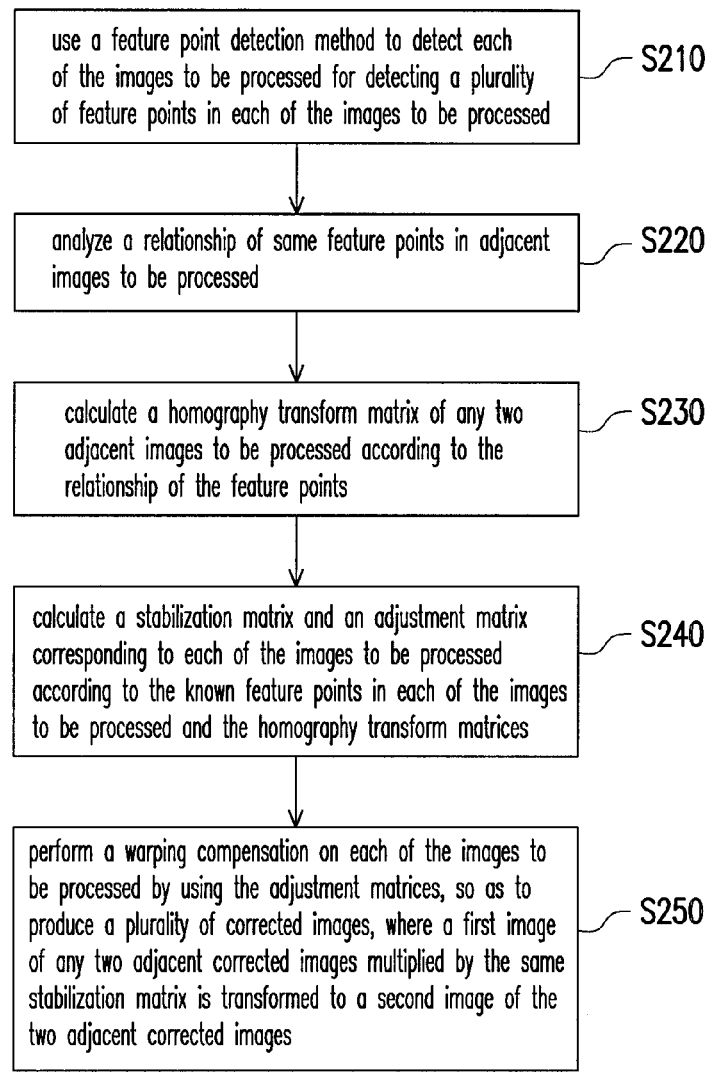
FIG. 2 is a flowchart illustrating an image stabilization method according to an exemplary embodiment of the disclosure.

FIG. 2 is a flowchart illustrating an image stabilization method according to an exemplary embodiment of the disclosure. The method of the present exemplary embodiment is adapted to the image stabilization device of FIG. 1, and the image stabilization method of the present exemplary embodiment is described in detail below with reference of various modules in FIG. 1.

In step S210, the feature point detection and analysis module 110 uses a feature point detection method to detect each of the images to be processed for detecting a plurality of feature points in each of the images to be processed. In step S220, the feature point detection and analysis module 110 analyzes a relationship of same feature points in adjacent images to be processed. In detail, the feature point detection and analysis module 110 has to first detect the feature points in each of the images to be processed, and then track the feature points in the adjacent images to be processed.

In the present exemplary embodiment, the feature point detection and analysis module 110 uses a Harris feature point detection algorithm, though the disclosure is not limited thereto. In the Harris feature point detection algorithm, a local rectangular region in an image to be processed is observed, and the rectangular region is slightly moved towards different directions in the image to be processed to learn a strength of gray level variation in the rectangular region, and then a corresponding response function is designed by observing a characteristic of the gray level variation, so as to determine whether the point is a Harris feature point.

A method of finding the Harris feature point is described below with reference of a mathematical expression. When a sum of variations obtained when the rectangular region is moved towards various direction is described, a 2×2 symmetric matrix Z is obtained, and feature values $\lambda_1$ and $\lambda_2$ thereof can be analyzed to obtain response functions so as to determine whether a central point of the rectangular region is the Harris feature point:

$$R(Z) = \det(Z) - k \cdot trace^2(Z) \qquad (1)$$
$$= \lambda_1 \lambda_2 - k \cdot (\lambda_1 + \lambda_2)^2$$

Where, k is a constant, and based on calculation of the function R, anterior m points with the maximum response in the image to be processed are selected to serve as a basis for a subsequent tracking operation, where m is a positive integer.

After the feature points in the image to be processed are detected, the step S220 is executed to analyze a motion vector of each of the feature points between a position of a first image and a position of a second image in the adjacent images to be processed, which is referred to as a feature point tracking method. In the present exemplary embodiment, an optical flow method is used for estimation. It is assumed that a same feature point $p_i$ is invariant in a $t^{th}$ image to be processed and a $(t+\Delta t)^{th}$ image to be processed, and $\Delta t$ is a natural number.

$$I_t(x, y) = I_{t+\Delta t}(x+u, y+v) \quad (2)$$

Where, $I_t(x, y)$ is a position of the feature point $p_i$ in the $t^{th}$ image to be processed, $I_{t+\Delta t}(x+u, y+v)$ is a position of the feature point $p_i$ in the $(t+\Delta t)^{th}$ image to be processed, and $(u,v)$ represents a motion vector of the feature point $p_i$. A Taylor expansion is used to expand the right part of the equation (2):

$$I_{t+\Delta t}(x+u, y+v) \approx I_{t+\Delta t}(x, y) + \frac{\partial I}{\partial x}u + \frac{\partial I}{\partial x}v \quad (3)$$

Considering that the feature point $p_i$ satisfies appearance invariance, a following result is obtained according to the combination of equations (2) with (3):

$$0 = I_{t+\Delta t}(x+u, y+v) - I_t(x, y) \quad (4)$$
$$\approx I_t + I_x u + I_y v$$

Where, $I_{nm} = \partial I/\partial t$, $I_x = \partial I/\partial x$ and $I_y = \partial I/\partial y$.

Since the equation (4) has two unknown numbers u and v and only one equation, it is assumed that adjacent points of the feature point $p_i$ the same motion vector, and considering a r×r window that takes the feature point $p_i$ as a center, where r is a positive integer, there is sufficient information to solve the unknown numbers u and v, i.e. the motion vector of the feature point $p_i$.

In step S230, the homography matrix calculation module 120 is coupled to the feature point detection and analysis module 110, and calculates a homography transform matrix of adjacent images to be processed according to the relationship of the feature points. In detail, the so-called homography perspective projection transform is to calculate a transform relationship of a plane in different viewing angles, and it is assumed that a and b are respectively positions of a wide-angle video camera at different time instances, $Q_i$ is any point on the plane that is captured. Assuming a $^aQ_i$ and $^bQ_i$ are projections of the point $Q_i$ at the positions a and b, then:

$$^aQ_i = H_{ba} \cdot {}^bQ_i \quad (5)$$

Where, $H_{ba}$ is a 3×3 matrix, as shown in an equation (6):

$$H_{ba} = \begin{bmatrix} h_{11} & h_{12} & h_{13} \\ h_{21} & h_{22} & h_{23} \\ h_{31} & h_{32} & h_{33} \end{bmatrix} \quad (6)$$

For example, a transform relationship of a same feature point between a position $(x_t, y_t)$ in the $t^{th}$ image to be processed and a position $(x_{t+\Delta t}, y_{t+\Delta t})$ in the $(t+\Delta t)^{th}$ image to be processed can be represented by a following equation (7):

$$\begin{bmatrix} x_{t+\Delta t} \\ y_{t+\Delta t} \\ 1 \end{bmatrix} = H_{t,t+\Delta t} \begin{bmatrix} x_t \\ y_t \\ 1 \end{bmatrix} = \begin{bmatrix} h_{11} & h_{12} & h_{13} \\ h_{21} & h_{22} & h_{23} \\ h_{31} & h_{32} & h_{33} \end{bmatrix} \begin{bmatrix} x_t \\ y_t \\ 1 \end{bmatrix} \quad (7)$$

Since the feature point tracking is performed in the step S220 according to the optical flow method, i.e. the relationship of the same feature points in the tandem adjacent images to be process has been known, by introducing the relationship of the same feature points to the equation (6), the homography transform matrix $H_{ba}$ is obtained according to a sum of least squares method, though the disclosure is not limited thereto.

Then, in step S240, the trajectory smoothing module 130 coupled to the homography matrix calculation module 120 calculates a stabilization matrix and an adjustment matrix corresponding to each of the images to be processed according to the known feature points in each of the images to be processed and the homography transform matrices.

Figure 3A:
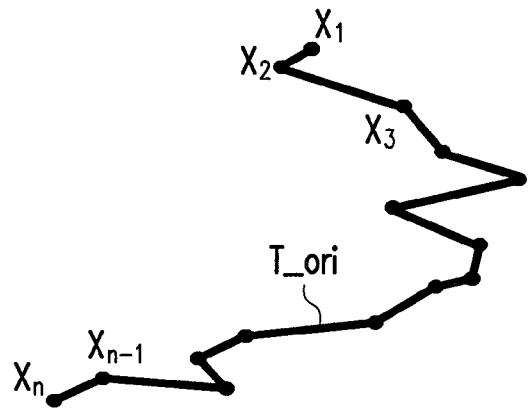
FIG. 3A is a schematic diagram of an original trajectory T_ori of images to be processed according to an exemplary embodiment of the disclosure.

FIG. 3A is a schematic diagram of an original trajectory T_ori of images to be processed according to an exemplary embodiment of the disclosure.

Referring to FIG. 3A, it is assumed that there are n images to be processed, where n is a positive integer. For example, homography projection transform between a first image to be processed and a second image to be processed is represented as $x_2 = H_{1,2} x_1$; and homography projection transform between the seocnd image to be processed and a third image to be processed is represented as $x_3 = H_{2,3} x_2$; namely:

$$x_n = H_{n-1,n} x_{n-1} \quad (8)$$

Figure 3B:
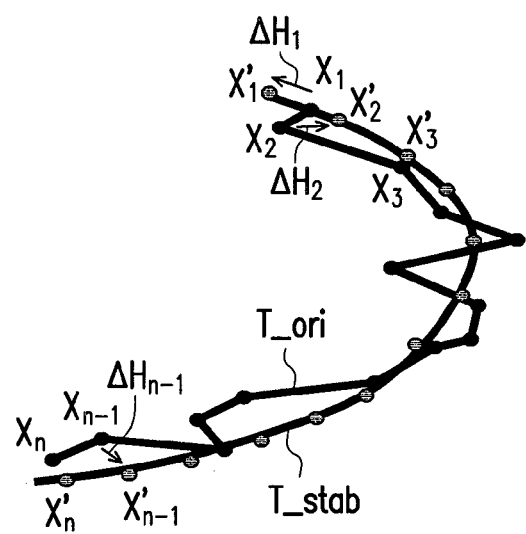
FIG. 3B is a schematic diagram of an original trajectory T_ori and a smooth trajectory T_stab of the images to be processed according to an exemplary embodiment of the disclosure.

Where, $x_n$ is coordinate of each feature point in an $n^{th}$ image to be processed, and $H_{n-1,n}$ is a homography transform matrix between the $(n-1)^{th}$ and $n^{th}$ images to be processed. The transform may include unknown smooth and un-smooth components, and in the disclosure, it is assumed that the smooth component is unchanged between the n images to be processed, and it is required to obtain the adjust values required for each image to be processed for presenting the smooth trajectory. FIG. 3B is a schematic diagram of the original trajectory T_ori and a smooth trajectory T_stab of the images to be processed according to an exemplary embodiment of the disclosure. Referring to FIG. 3B, an adjustment relationship between the original trajectory T_ori and the smooth trajectory T_stab is $x'_1 = \Delta H_1 x_1$, $x'_2 = \Delta H_2 x_2$, and deduced by analogy:

$$x'_n = \Delta H_n x_n \quad (9)$$

Where, $\Delta H_n$ is an adjustment matrix of the $n^{th}$ image to be processed, and the adjustment matrix represents an un-smooth correction required for adjusting each of the images to be processed from the original trajectory T_ori to the smooth trajectory T_stab.

In other words, after each of the images to be processed is corrected by the adjustment matrix, each of the corrected images has the smooth and stable transform relationship, $x'_2 = H_{stab} x'_1$, $x'_3 = H_{stab} x'_2$, and deduced by analogy:

$$x'_n = H_{stab} x'_{n-1} \quad (10)$$

Where, $H_{stab}$ is a stabilization matrix, and each of the corrected images can be transformed through the same stabilization matrix $H_{stab}$. In other words, a first image of adjacent corrected images multiplied by the same stabilization matrix $H_{stab}$ is transformed to a second image of the adjacent corrected images.

In detail, $\Delta H_1, \Delta H_2, \ldots, \Delta H_n$ and $H_{stab}$ in the equations (9) and (10) are the unknown variables to be solved. In the present exemplary embodiment, regarding a function formed by taking the adjustment matrices $\Delta H_1, \Delta H_2, \ldots, \Delta H_n$ and the stabilization matrix $H_{stab}$ as variables, and minimization of the function is taken as an objective, a value operation is performed based on the known feature points in each of the images to be processed and the homography transform matrices, so as to obtain solutions of the adjustment matrices $\Delta H_1, \Delta H_2, \ldots, \Delta H_n$ and the stabilization matrix $H_{stab}$, which is represented by a following mathematic equation:

$$\min_{\Delta H_n, H_{stab}} f(\Delta H_n, H_{stab}) = \min_{\Delta H_n, H_{stab}} \sum_n \|x'_n - H_{stab} x'_{n-1}\|^2 \quad (11)$$
$$= \min_{\Delta H_n, H_{stab}} \sum_n \left\| \begin{array}{c} \Delta H_n x_n - \\ H_{stab} \Delta H_{n-1} x_{n-1} \end{array} \right\|^2$$

The equation (11) is non-linear for the variables of the adjustment matrices $\Delta H_1, \Delta H_2, \ldots, \Delta H_n$ and the stabilization matrix $H_{stab}$ to be solved, so that a non-linear optimization method can be used for solving, and in the present exemplary embodiment, a commonly used sequential quadratic programming method is used, and the all of the known $x_n$ are used to calculate optimal solutions of the adjustment matrices $\Delta H_1, \Delta H_2, \ldots, \Delta H_n$ and the stabilization matrix $H_{stab}$ according to a recursion method. In another embodiment, regarding a function formed by taking the adjustment matrices and the stabilization matrix as variables, and minimization of the function is taken as an objective, an optimization value operation is performed based on the known feature points in each of the images to be processed and the homography transform matrices, so as to calculate optimal solutions of the adjustment matrix and the stabilization matrix.

Referring to FIG. 2, in step S250, the image correction module 140 performs a warping compensation on each of the images to be processed by the adjustment matrices $\Delta H_1, \Delta H_2, \ldots, \Delta H_n$, so as to produce a plurality of corrected images.

For example, a transform relationship between a position $(x_1, y_1)$ of a pixel point in the first image to be processed and a position $(x'_1, y'_1)$ of the corrected pixel point can be represented by a following equation (12):

$$\begin{bmatrix} x'_1 \\ y'_1 \\ 1 \end{bmatrix} = \Delta H_1 \begin{bmatrix} x_1 \\ y_1 \\ 1 \end{bmatrix} = \begin{bmatrix} \Delta h_{11} & \Delta h_{12} & \Delta h_{13} \\ \Delta h_{21} & \Delta h_{22} & \Delta h_{23} \\ \Delta h_{31} & \Delta h_{32} & \Delta h_{33} \end{bmatrix} \begin{bmatrix} x_1 \\ y_1 \\ 1 \end{bmatrix} \quad (12)$$

After the steps S210-S250 of the image processing flow of the present exemplary embodiment, the corrected images may have a smooth and stable transform relationship.

A main difficulty of resolving a stabilization problem of the images captured through a mobile carrier is to successfully separate a smooth trajectory of a motion of the mobile carrier and temporary shaking that is required to be actually corrected. Since the smooth trajectory of the motion of the mobile carrier is unknown, a commonly used estimation method is to assume the smooth trajectory to be a certain type (for example, a polynomial) and find a suitable parameter setting to approximate the smooth trajectory. However, the mobile carrier moves with considerable uncertainty, and accuracy of the parameter setting limits commonality of a general image stabilization algorithm.

Accordingly, the method of the disclosure solves the variables of the adjustment matrices $\Delta H_1, \Delta H_2, \ldots, \Delta H_n$ and the stabilization matrix $H_{stab}$ without further decomposing the stabilization matrix $H_{stab}$ into detailed parameters of translation, scaling and rotation, etc. and establishing a smoothing model. The method of the disclosure uses one stabilization matrix to replace the three types of parameters, which may include various possible combinations of the translation, scaling and rotation parameters, by which both simplicity of solving and practicability of application are considered. On the other hand, the method of the disclosure is adapted to different motion models of, for example, vehicles or airplanes, etc., and it is unnecessary to set parameters according to different usage environments, so that commonality thereof is better than that of the existing techniques. Differences between the method of the disclosure and the existing techniques are described below with reference of figures.

Figure 4A:
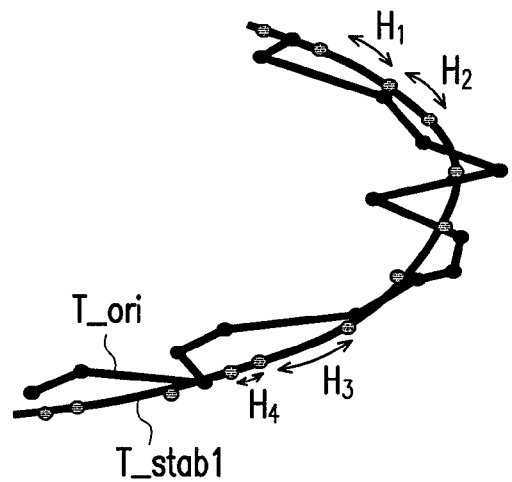
FIG. 4A and FIG. 4B are schematic diagrams of an existing technique and a method of the disclosure respectively performing smoothing processing on an original trajectory T_ori of images to be processed according to another exemplary embodiment of the disclosure.
Figure 4B:
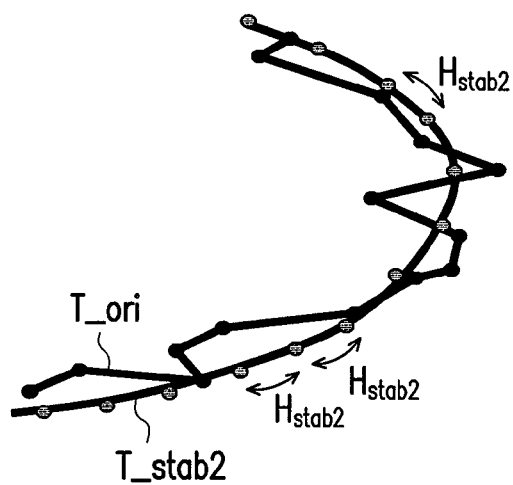

FIG. 4A and FIG. 4B are schematic diagrams of an existing technique and the method of the disclosure respectively performing smoothing processing on an original trajectory T_ori of images to be processed according to another exemplary embodiment of the disclosure. Referring to FIG. 4A, the method of FIG. 4A only considers a smooth degree of a smooth trajectory T_stab1 in order to optimize the smooth trajectory T_stab1, though the transform relationship of the corrected images is not considered, so that transform matrices $H_1, H_2, H_3$ and $H_4$ of FIG. 4A are not consistent, which causes inconsistent video playback speeds of the corrected images and leads to visual discomfort. Comparatively, referring to FIG. 4B, the method of the disclosure not only considers the smooth degree of a smooth trajectory T_stab2, but also considers the transform relationship of the corrected images, so that the points are evenly distributed on the smooth trajectory T_stab2, i.e. the transform relationship of the corrected images is consistent, and the corrected images have the same stabilization matrix $H_{stab2}$, in this way, the inconsistent video playback speeds of the played corrected images is avoided.

Figure 5A:
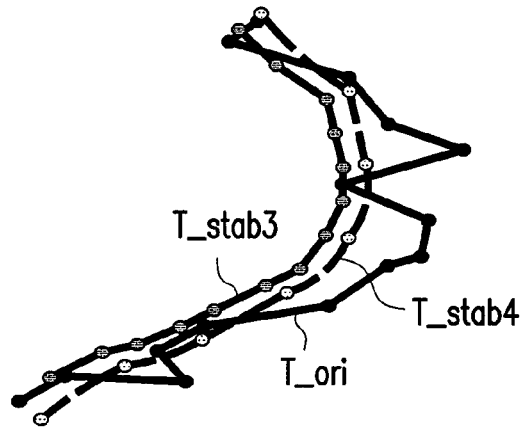
FIG. 5A and FIG. 5B are schematic diagrams of an existing technique and a method of the disclosure respectively performing a smoothing processing on an original trajectory T_ori of images to be processed according to still another exemplary embodiment of the disclosure.
Figure 5B:
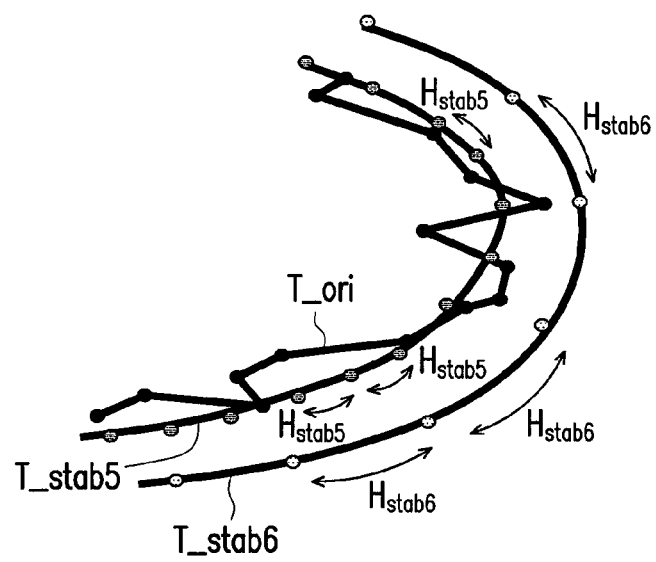

FIG. 5A and FIG. 5B are schematic diagrams of an existing technique and the method of the disclosure respectively performing a smoothing processing on an original trajectory T_ori of images to be processed according to still another exemplary embodiment of the disclosure. Referring to FIG. 5A, the existing technique is required to select an optimal parameter, and different processing results are obtained according to different parameter selections. A smooth trajectory T_stab3 is a processing result obtained according to a parameter of a first sampling rate, and a smooth trajectory T_stab4 is a processing result obtained according to a parameter of a second sampling rate, where the first sampling rate is higher than the second sampling rate. In order for the two trajectories T_stab3 and T_stab4 to possess the same degree of smoothness, one needs to properly set the parameters or have prior knowledge on the change of sampling rates. On the other hand, referring to FIG. 5B, the method of the disclosure does not limit an adjust value of the stabilization matrix, for example, the stabilization matrices $H_{stab5}$ and $H_{stab6}$ are different but the trajectories T_stab5 and T_stab6 have the same degree of smoothness. Therefore, the method of the disclosure is able to blindly find the same smooth trajectory even without prior knowledge of the change in sampling rate.

In summary, in the image stabilization method and the image stabilization device of the disclosure, the shaking component can be removed without limiting a form of the smooth trajectory of the images to be processed, so as to achieve a visually stable effect. In the disclosure, stableness of the corrected images and consistency of the transform relationship are simultaneously considered, and it is unnecessary to find a motion model corresponding to a moment when the image to be processed is shot or set parameters that influence the smooth degree, so that the image stabilization method and the image stabilization device of the disclosure are adapted to correct images to be processed that are captured in different shooting environments. Since the corrected images have the consistent transform relationship, the inconsistent video playback speeds of the played corrected images is avoided. The technique of the disclosure can be widely applied to various types of mobile carriers due to its algorithmic flexibility, for example, airplanes or vehicles, etc. that carry an image capturing device. Therefore, the technique of the disclosure can help boost industries such as driving recorders, bicycling with picture taking and aerial photography, etc.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An image stabilization method for processing a plurality of images, comprising:
   using a feature point detection method to detect each of the images to be processed, so as to detect a plurality of feature points in each of the images to be processed;
   analyzing a relationship of same feature points in adjacent images to be processed;
   calculating a homography transform matrix of the adjacent images to be processed according to the relationship of the feature points;
   calculating a stabilization matrix and an adjustment matrix corresponding to each of the images to be processed according to the known feature points in each of the images to be processed and the homography transform matrices; and
   compensating each of the images to be processed by the adjustment matrix, so as to produce a plurality of corrected images,
   wherein a first image of adjacent corrected images multiplied by the same stabilization matrix is transformed to a second image of the adjacent corrected images.

2. The image stabilization method as claimed in claim 1, wherein the step of calculating the stabilization matrix and the adjustment matrix corresponding to each of the images to be processed according to the known feature points in each of the images to be processed and the homography transform matrices comprises:
   performing an optimization value operation on a function formed by taking the adjustment matrix and the stabilization matrix as variables according to the known feature points in each of the images to be processed and the homography transform matrices while taking minimization of the function as an objective, so as to calculate optimal solutions of the adjustment matrix and the stabilization matrix.

3. The image stabilization method as claimed in claim 2, wherein the optimization value operation comprises performing the value operation by a non-linear optimization method.

4. The image stabilization method as claimed in claim 3, wherein the non-linear optimization method comprises a sequential quadratic programming method, and solutions of the adjustment matrix and the stabilization matrix are calculated according to a recursion method.

5. The image stabilization method as claimed in claim 1, wherein the step of analyzing the relationship of the same feature points in adjacent images to be processed comprises:
   respectively detecting a motion vector of each of the feature points between a position of a first image and a position of a second image in the adjacent images to be processed.

6. The image stabilization method as claimed in claim 1, further comprising using a feature point tracking method to analyze the relationship of the same feature points in the adjacent images to be processed, wherein the feature point tracking method comprises using an optical flow method to estimate a motion vector of each of the feature points.

7. The image stabilization method as claimed in claim 1, wherein the feature point detection method comprises using a Harris feature point detection method to detect the feature points in each of the images to be processed.

8. An image stabilization device for processing a plurality of images, the image stabilization device comprising a memory storing a software modules and a processor executing the software module, wherein the software module comprising:
   a feature point detection and analysis module, detecting each of the images to be processed for detecting a plurality of feature points in each of the images to be processed, and analyzing a relationship of same feature points in adjacent images to be processed;
   a homography matrix calculation module, coupled to the feature point detection and analysis module, and calculating a homography transform matrix of the adjacent images to be processed according to the relationship of the feature points;
   a trajectory smoothing module, coupled to the homography matrix calculation module, and calculating a stabilization matrix and an adjustment matrix corresponding to each of the images to be processed according to the known feature points in each of the images to be processed and the homography transform matrices; and
   an image correction module, coupled to the trajectory smoothing module, and compensating each of the images to be processed by the adjustment matrix respectively, so as to produce a plurality of corrected images,
   wherein a first image of adjacent corrected images multiplied by the same stabilization matrix is transformed to a second image of the adjacent corrected images.

9. The image stabilization device as claimed in claim 8, wherein
   the trajectory smoothing module performs an optimization value operation on a function formed by taking the adjustment matrix and the stabilization matrix as variables according to the known feature points in each of the images to be processed and the homography transform matrices while taking minimization of the function as an objective, so as to calculate optimal solutions of the adjustment matrix and the stabilization matrix.

10. The image stabilization device as claimed in claim 9, wherein
    the trajectory smoothing module performs the value operation by a non-linear optimization method.

11. The image stabilization device as claimed in claim 10, wherein
    the trajectory smoothing module uses a sequential quadratic programming method as the non-linear optimization method, and calculates solutions of the adjustment matrix and the stabilization matrix according to a recursion method.

12. The image stabilization device as claimed in claim 8, wherein
    the feature point detection and analysis module respectively detects a motion vector of each of the feature points between a position of a first image and a position of a second image in the adjacent images to be processed.

13. The image stabilization device as claimed in claim 12, wherein
the feature point detection and analysis module uses a feature point tracking method to analyze the relationship of the same feature points in the adjacent images to be processed, wherein the feature point tracking method comprises using an optical flow method to estimate a motion vector of each of the feature points.

14. The image stabilization device as claimed in claim 8, wherein
the feature point detection and analysis module uses a Harris feature point detection method to detect the feature points in each of the images to be processed.

* * * * *